(12) United States Patent
Liau

(10) Patent No.: US 12,702,233 B2
(45) Date of Patent: Aug. 11, 2026

(54) SKIN-FOAM ARCHITECTURE FOR SEATING

(71) Applicant: Tesla, Inc., Austin, TX (US)

(72) Inventor: Forrest Wen Liau, Palo Alto, CA (US)

(73) Assignee: Tesla, Inc., Austin, TX (US)

( * ) Notice: Subject to any disclaimer, the term of this patent is extended or adjusted under 35 U.S.C. 154(b) by 202 days.

(21) Appl. No.: 16/219,619

(22) Filed: Dec. 13, 2018

(65) Prior Publication Data

US 2019/0208914 A1 Jul. 11, 2019

Related U.S. Application Data

(60) Provisional application No. 62/614,797, filed on Jan. 8, 2018.

(51) Int. Cl.
*A47C 7/18* (2006.01)
*B29C 44/14* (2006.01)
(Continued)

(52) U.S. Cl.
CPC .............. *A47C 7/18* (2013.01); *B29C 44/145* (2013.01); *B29C 44/148* (2013.01);
(Continued)

(58) Field of Classification Search
CPC ....... B29C 44/00; B29C 44/14; B29C 44/145; B29C 44/146; B29C 44/0461;
(Continued)

(56) References Cited

U.S. PATENT DOCUMENTS 3,161,436 A * 12/1964 Hood ...................... B29C 44/12
264/46.7
3,864,206 A * 2/1975 Linderoth .............. B29C 44/14
428/313.5
(Continued)

FOREIGN PATENT DOCUMENTS

JP 2000351351 A * 12/2000
JP 3882596 B2 * 2/2007
KR 2017008063 A * 1/2017 ............ B32B 27/12

OTHER PUBLICATIONS

"What Does Curing Mean?", (2015), Retrieved from https://www.corrosionpedia.com/definition/354/curing (Year: 2015).*
(Continued)

*Primary Examiner* — Jeffrey M Wollschlager
*Assistant Examiner* — Edgaredmanuel Troche
(74) *Attorney, Agent, or Firm* — Schwegman Lundberg & Woessner, P.A.

(57) ABSTRACT

A method for forming a skin-foam architecture for a seat. The method includes loading a backing cover into a first portion of the tool. The method includes applying and curing a skin on a second portion of the tool, the skin including a first layer, and a second layer under the first layer. The method includes laminating a mesh under the skin. The method includes attaching and curing a foam layer under the mesh and the skin. The method includes mating the first and second portions of the tool. The method includes introducing foam between the mated first and second portions of the tool.

10 Claims, 18 Drawing Sheets

(51) Int. Cl.

| | |
|---|---|
| ***B29K 75/00*** | (2006.01) |
| ***B29L 31/00*** | (2006.01) |
| ***B29L 31/58*** | (2006.01) |
| ***B60N 2/70*** | (2006.01) |

(52) U.S. Cl.

CPC ........ *B60N 2/7017* (2013.01); *B29K 2075/00* (2013.01); *B29L 2031/58* (2013.01); *B29L 2031/771* (2013.01)

(58) Field of Classification Search

CPC . B29C 44/12; B29C 70/30; B29C 2949/3078; B29C 2033/3864; B29K 2075/00; B29L 2031/58; B29L 2031/771; A47C 7/18; Y10S 297/01; Y10S 297/02; B60N 2/7094; B60N 2/00; B60N 2/58; B60N 2/7017

USPC ........ 264/46.6, 900, 45.5; 297/180.1, 180.12

See application file for complete search history.

(56) References Cited

U.S. PATENT DOCUMENTS

| | | | | |
|---|---|---|---|---|
| 4,670,925 | A * | 6/1987 | Carussi | B29C 44/0469 264/46.4 |
| 4,718,153 | A * | 1/1988 | Armitage | B29C 44/569 29/91.1 |
| 4,795,517 | A * | 1/1989 | Elliott | B29C 65/305 264/249 |
| 6,345,865 | B1 * | 2/2002 | Ashida | B62J 1/12 297/214 |
| 6,489,595 | B1 * | 12/2002 | Check | B29C 66/727 219/202 |
| 10,486,407 | B2 | 11/2019 | De Wilde et al. | |
| 2002/0018876 | A1 * | 2/2002 | Matsuki | B29C 44/146 425/129.1 |
| 2005/0225128 | A1 * | 10/2005 | Diemer | B60N 2/0027 297/180.12 |
| 2007/0158981 | A1 * | 7/2007 | Almasi | B60N 2/5614 297/180.12 |
| 2008/0143157 | A1 * | 6/2008 | Burch | B29C 44/1228 264/46.4 |
| 2011/0039049 | A1 * | 2/2011 | Chow | B29C 44/1257 264/46.6 |
| 2013/0213950 | A1 * | 8/2013 | Bulgajewski | H05B 1/00 219/209 |
| 2014/0292043 | A1 * | 10/2014 | Nii | B60N 2/68 297/452.61 |
| 2015/0165750 | A1 * | 6/2015 | De Wilde | B32B 37/1284 156/245 |
| 2017/0240080 | A1 * | 8/2017 | Drbohlav | B60N 2/5891 |

OTHER PUBLICATIONS

Machine English translation of Oh Young Chan, (KR-2017008063-A), 2017 (Year: 2017).*

Translation of Kondo et al. (JP-2000351351-A) (Year: 2000).*

Translation of JP-3882596-B2 (Year: 2007).*

* cited by examiner 300
306
304
302
310
308

1600
1610
1612
1602
1604
1608

1600
1610
1612
1602
1604
1608

SKIN-FOAM ARCHITECTURE FOR SEATING

CROSS-REFERENCE TO RELATED APPLICATION

The present U.S. Utility patent application claims priority pursuant to 35 U.S.C. § 119(e) to U.S. Provisional Application No. 62/614,797, entitled "Skin-Foam Architecture for Seating", filed Jan. 8, 2018, which is hereby incorporated herein by reference in its entirety and made part of the present U.S. Utility patent application for all purposes.

TECHNICAL FIELD

The present disclosure relates to a skin-foam architecture. More particularly, the present disclosure relates to a spray skin-foam architecture for vehicle seating.

BACKGROUND

Traditional vehicle seats consist of foam covered by a separately-fabricated trim cover made from a textile, animal leather, or synthetic leather. This trim cover is then pre-laminated to a thin (e.g. 3-6 mm thick) foam. These seats reveal seams, which may be unsightly, and require significant manufacturing time to sew the pieces together, which increases cost. Separately, skin-foam seats are typically used in non-premium seating, such as construction vehicle seats, or small seats (for example, bicycle seats), but these do not provide significant comfort. Hence, there is a need for a skin-foam architecture that overcome the aforementioned drawbacks and that could be used to create plush-feeling vehicle seating.

SUMMARY

The present disclosure introduces a method for forming the skin-foam architecture into plush-feeling seating, such as for a vehicle or generally any seating. The method includes loading a backing cover into a first portion of the tool and applying and curing a spray skin on a second portion of the tool. The spray skin has a first layer and a second layer applied under the first layer. The method includes laminating a mesh under the skin. The method includes attaching and curing a foam layer under the mesh and the skin, mating the first and second portions of the tool, and introducing foam between the mated first and second portions of the tool.

In another embodiment, another method for forming the skin-foam architecture is described. The method includes loading a backing cover into a first portion of the tool, and applying and curing a spray skin on a second portion of the tool. The skin includes a first layer and a second layer applied under the first layer. The method includes laminating and curing a comfort pad under the skin. The method includes mating the first and second portions of the tool, and introducing foam between the mated first and second portions of the tool.

In another embodiment, another method for forming the skin-foam architecture is described. The method includes loading a backing cover into a first portion of the tool, loading an A-surface trim into a second portion of the tool. The A-surface trim includes a plurality of trim pieces. The method includes applying and curing a spray skin on portions of the A-surface trim, mating the first and second portions of the tool, and introducing foam between the mated first and second portions of the tool.

In another embodiment, another method for forming the skin-foam architecture is described. The method includes loading a backing cover into a first portion of a tool, laminating a comfort pad to an A-surface film, and inserting the laminated comfort pad and the A-surface film into a second portion of the tool. The method includes mating the first and second portions of the tool, and introducing foam between the mated first and second portions of the tool.

Four different approaches have been described in detail for forming the skin-foam architecture. Process steps from different approaches may be mixed and matched without any limitation. The skin-foam architecture described herein is a surface architecture that includes a thin soft layer between the thin surface skin and firmer load-bearing foam underneath. The soft layer enables surface compression at low initial load for a premium plush feel. Various exemplary implementations are shown and described in detail in later sections. In one embodiment, the skin-foam architecture includes the skin with softer thin foam layer formed underneath. In another embodiment, the skin-foam architecture includes the skin with a separately fabricated soft pad underneath. In yet another embodiment, the skin-foam architecture includes the skin connecting multiple soft trim pieces together. Further, in various embodiments, the skin-foam architecture includes the skin connected to a pre-laminated soft trim.

Figure 1:
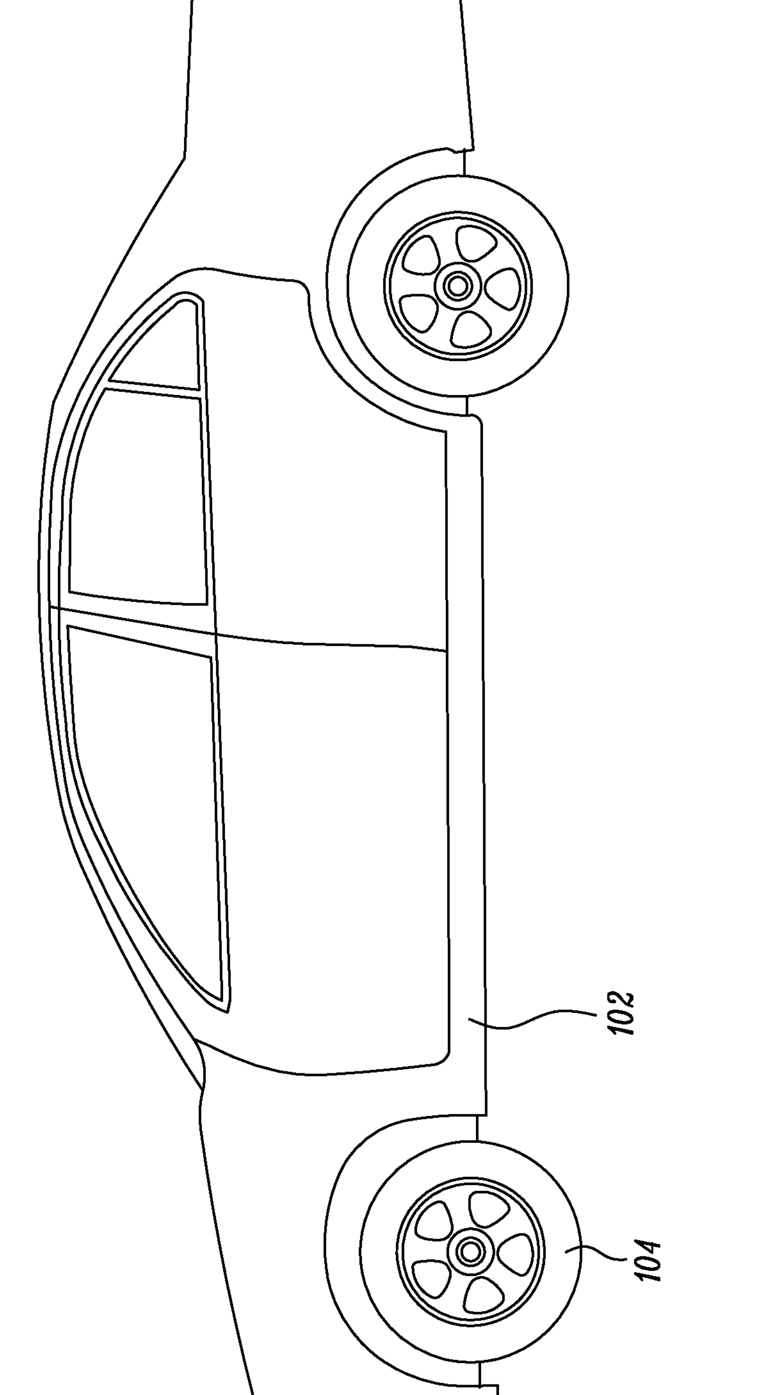
FIG. 1 illustrates a side profile of an exemplary vehicle according to certain embodiments of the invention.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting it.

DETAILED DESCRIPTION

FIG. 1 illustrates a side profile of an exemplary vehicle 100 such as, for example, a passenger car, truck, sport utility vehicle, or van. The vehicle 100 includes a frame 102 that is supported by a set of wheels 104. The vehicle 100 includes a power source (not shown) configured to propel the vehicle 100.

Passenger seating in the vehicle includes seating of different shapes and sizes. The present disclosure relates to various embodiments of skin-foam architecture that may be utilized for this seating. The details of the skin-foam architecture and the process for forming the seating will be explained in connection with FIGS. 2 to 18. It should be noted that the description provided in this section is equally applicable to any type of seating application for example, furniture and airplane seats, and is not limited to that described herein. Four different approaches for forming the seating have been described later in this section. The process steps from any of the approaches could be used in place of other steps from other approaches without any limitation, that is, the process steps may be mixed and matched with steps from the same or other methods. While the examples given describe a spray process for forming the skin, the skin can also be applied by painting or formed by an integral skin (or self-skinning) process of the foam on the tool surface without adding a separate skin material.

Figure 2:
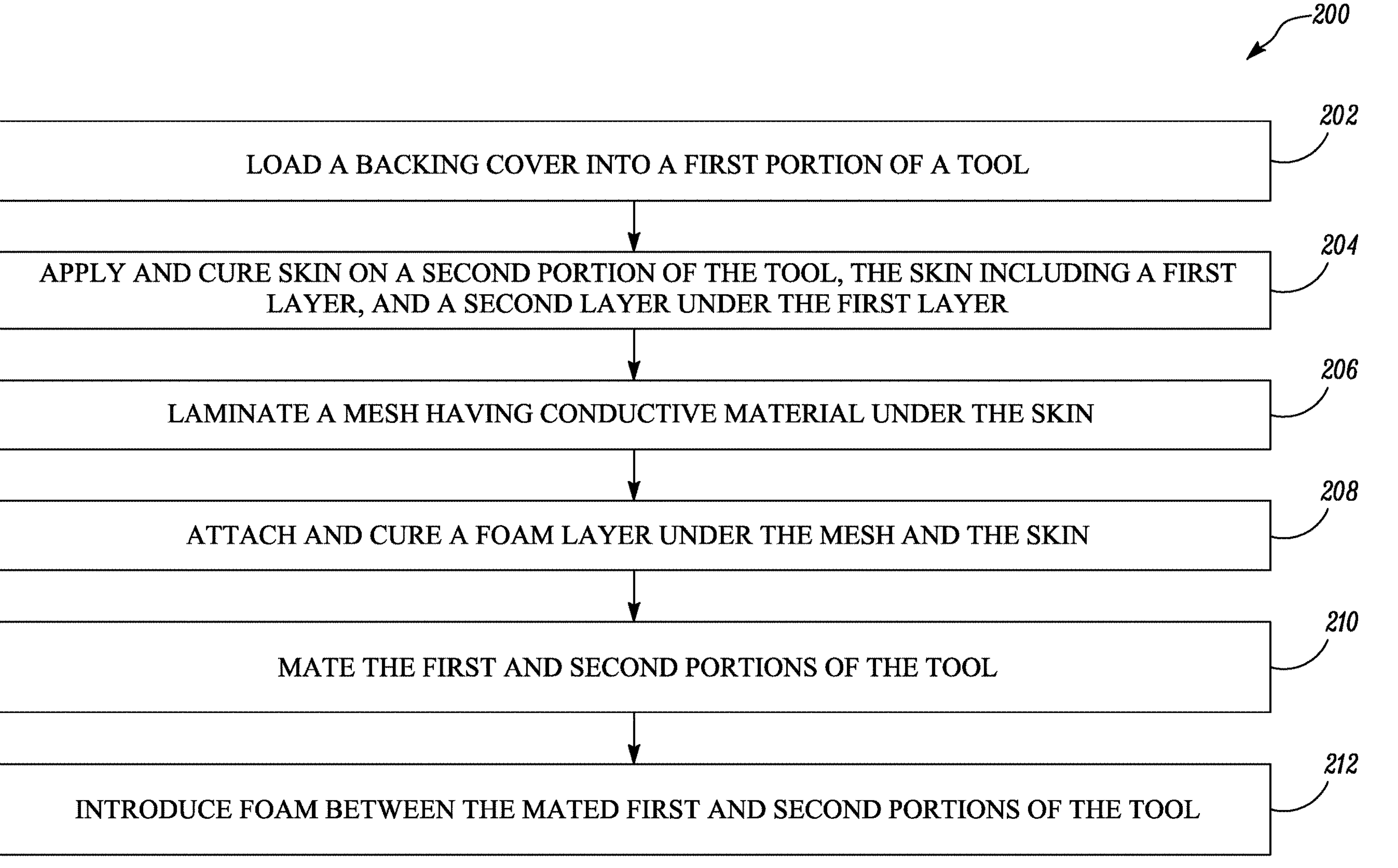
FIG. 2 illustrates a flowchart of a method for forming one embodiment of a skin-foam architecture according to certain embodiments of the invention.
Figure 3:
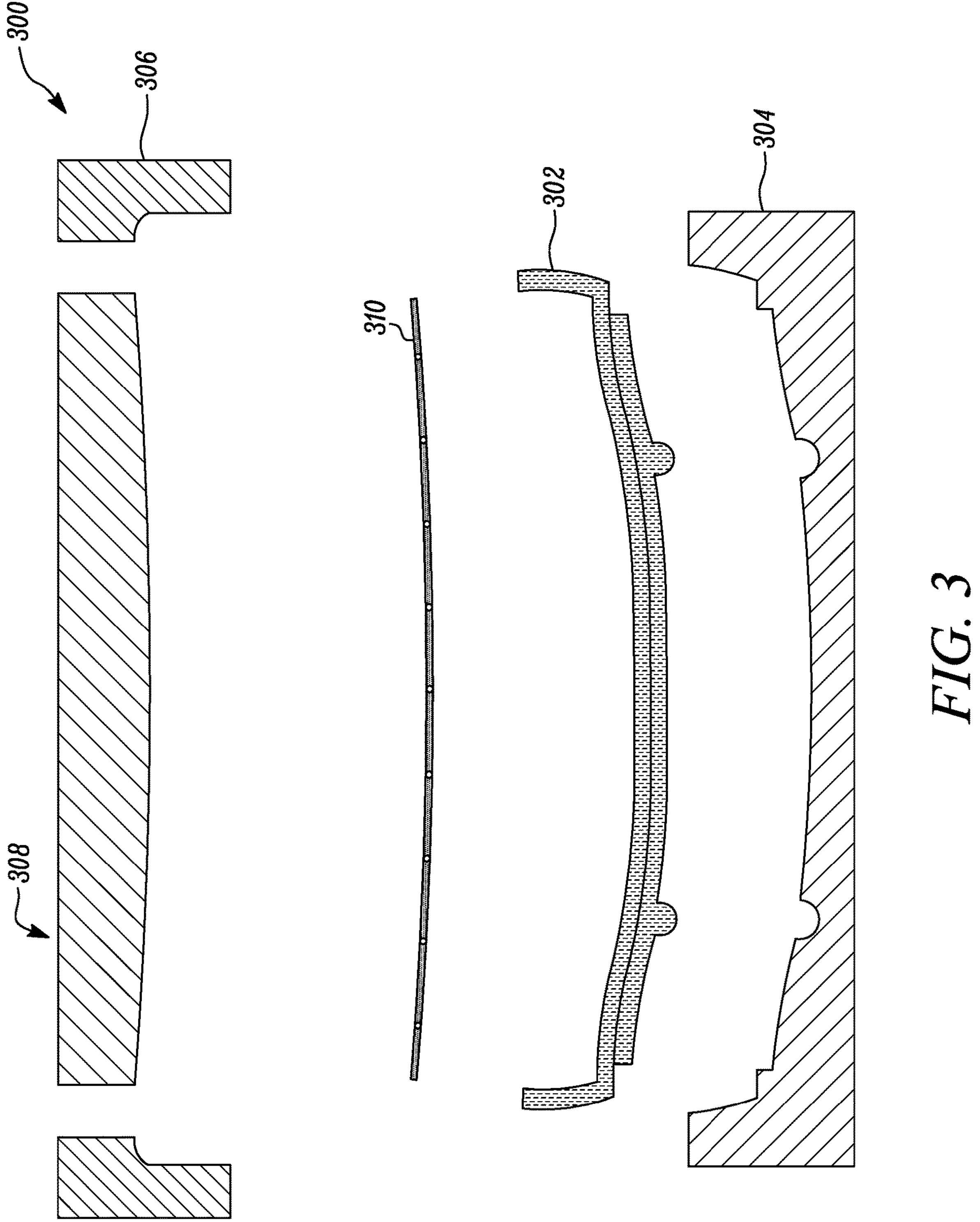
FIGS. 3 to 6 illustrate cross-sectional views of different procedural steps in forming the skin-foam architecture as per the method of FIG. 2 according to certain embodiments of the invention.
Figure 4:
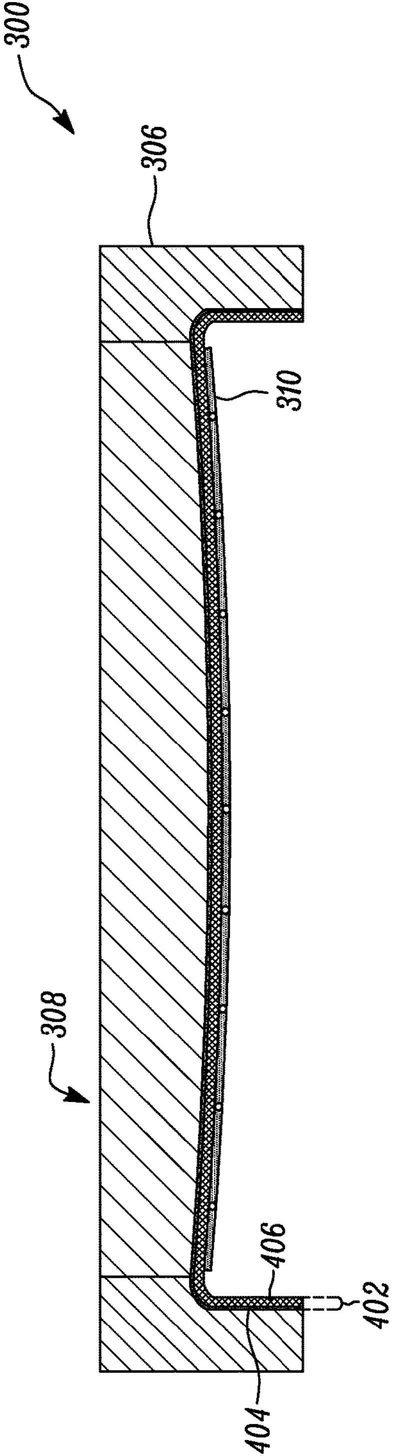
Figure 4:
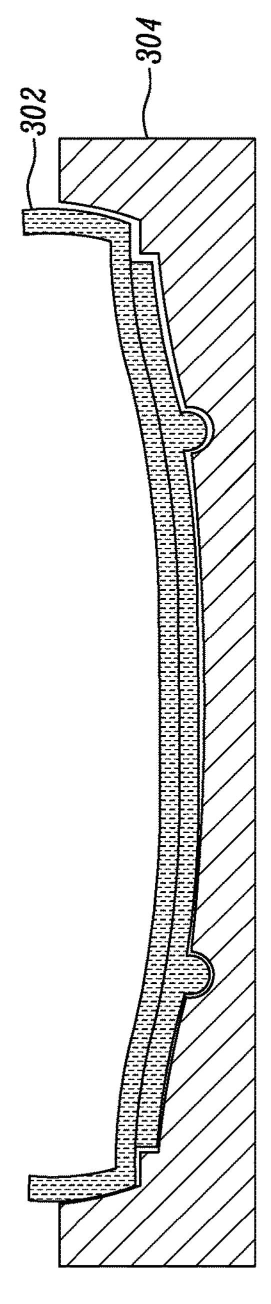
Figure 5:
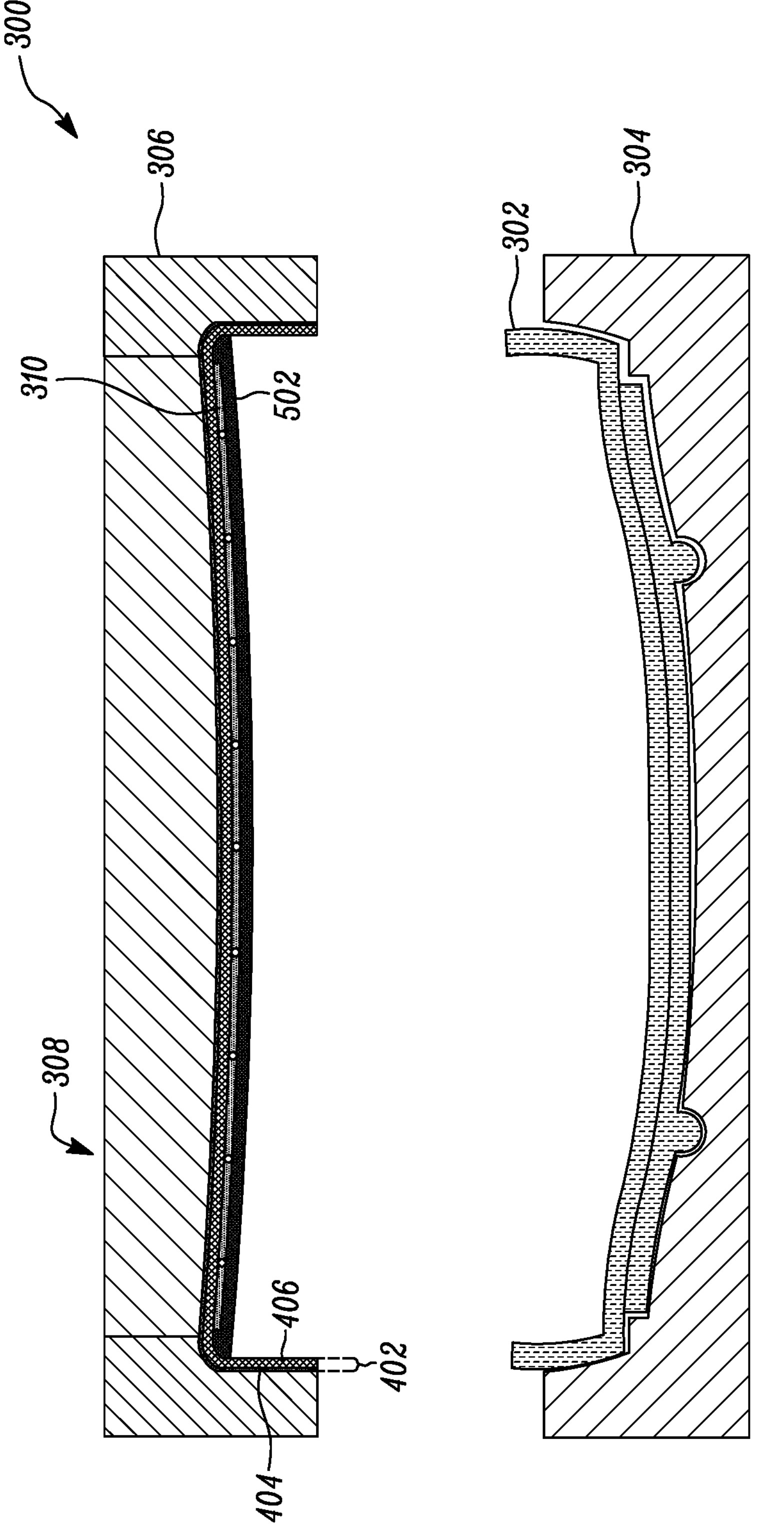
Figure 6:
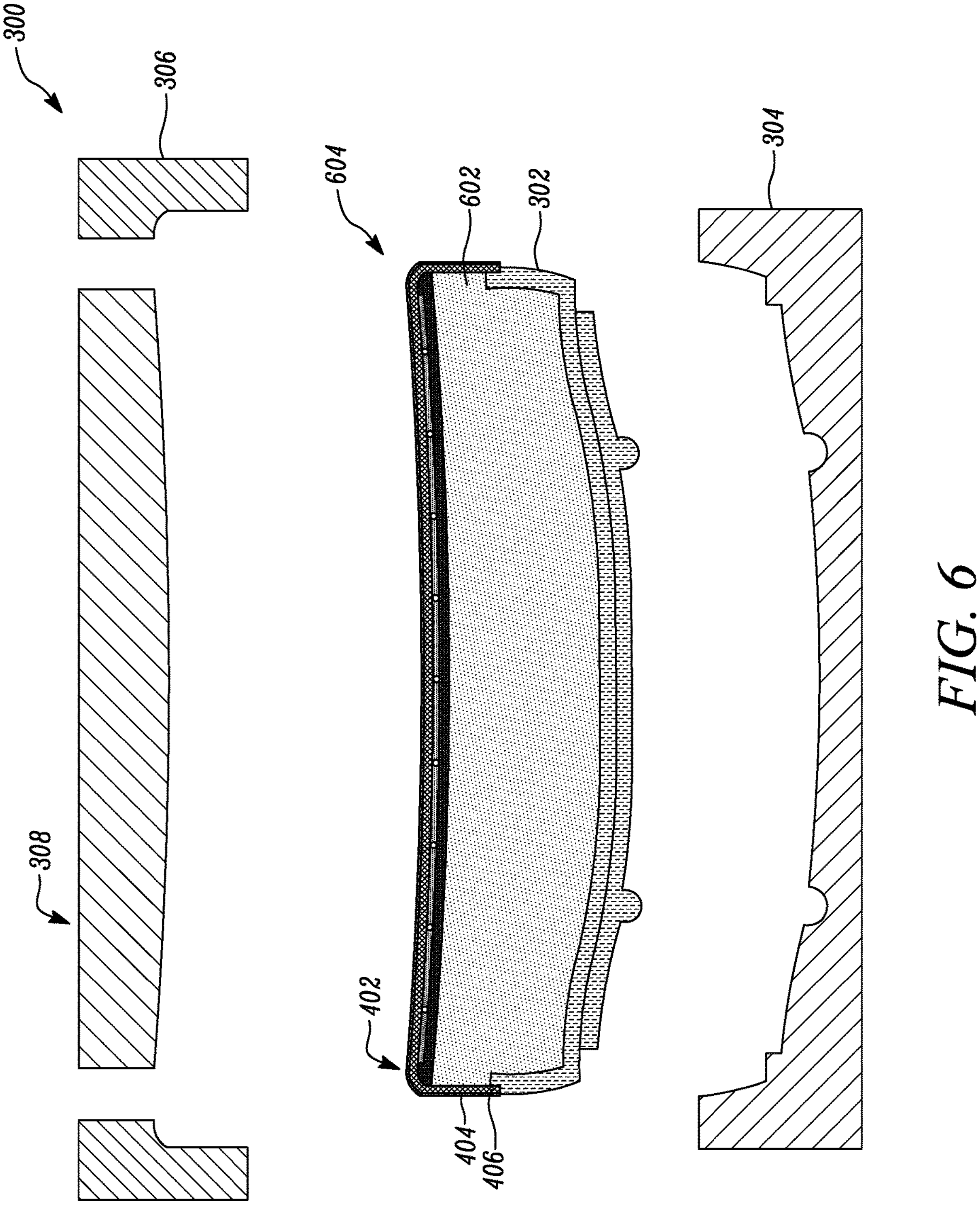

FIG. 2 is a flowchart of a method 200 for forming the skin-foam architecture and FIGS. 3 to 6 illustrate different steps in the process. Referring to FIGS. 2 and 3, at step 202, a backing cover 302 is loaded into a first portion 304 of a tool 300. Also, sliders 306 of a second portion 308 of the tool 300 are closed. The backing cover 302 may be rigid. Further, at step 204, a skin 402 (see FIG. 4) is applied onto the second portion 308 of the tool 300 and cured. The skin 402 includes a first layer 404 and a second layer 406. The second layer 406 is applied under the first layer 404. In one example, applying the skin 402 includes spraying the first layer 404 on the second portion 308 of the tool 300 and then spraying the second layer 406 under the first layer 404. Referring to FIG. 4, the first layer 404 is a very thin ultra-violet (UV) resistant A-surface polyurethane. The second layer 406 is a relatively thicker layer of polyurethane backing that may provide structure to the skin 402. In certain embodiments, instead of polyurethane, another thermoplastic polymer or another polymer or biofabricated material may be used for one of the layers. At step 206, a mesh 310 (see FIG. 3) having conductive material is laminated under the skin 402 (see FIG. 4). In certain embodiments, the mesh does not contain any conductive material, but rather, only structural material. More specifically, the mesh 310 is laminated under the second layer 406 of the skin 402. The mesh 310 has a thin construction and may include conductive fibers, wires, or yarns. When it contains conductive material, the mesh 310 may provide surface heating and capacitive sensing functionality for occupancy sensing. Other functionality (e.g. pressure sensing) can also be incorporated into the mesh 310.

Thereafter, at step 208, a foam layer 502 (see FIG. 5) is attached under the mesh 310 and the skin 402 and then cured. The foam layer 502 is a comfort foam layer or a pad that is sprayed or poured onto the mesh 310 laminate and the skin 402. The foam layer 502 may bond the mesh 310 to the skin 402 and provides a plush initial feel. At step 210, the first and second portions 304, 308 of the tool 300 are mated with each other, and at step 212, foam 602 (see FIG. 6) is introduced between the first and second portions 304, 308 of the tool 300 using known foam-in-place process. Thereafter, the formed seating 604 is released from the tool 300. Seating 604 may be assembled on a seat frame of the vehicle 100.

Figure 7:
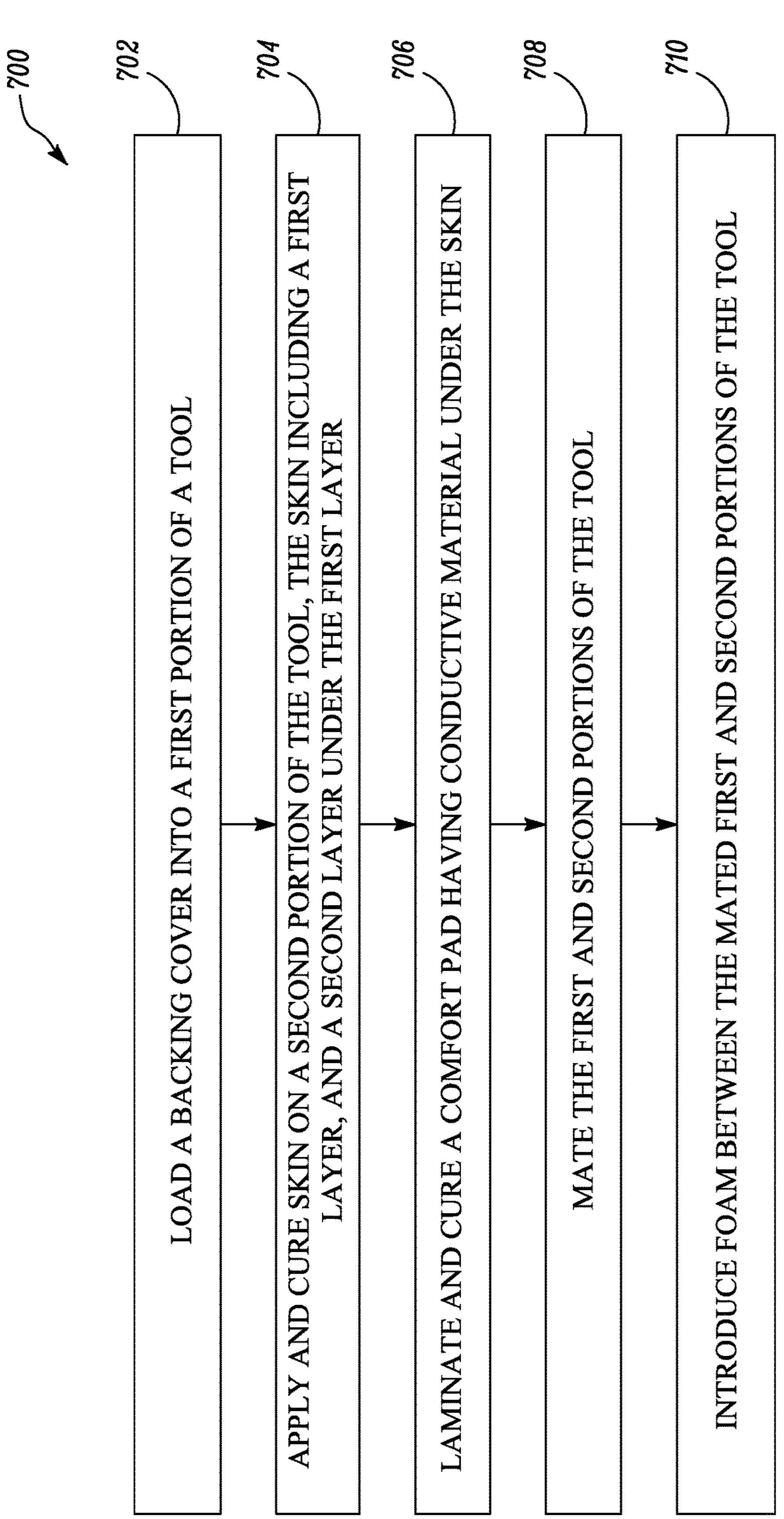
FIG. 7 illustrates a flowchart of a method for forming another embodiment of the skin-foam architecture according to certain embodiments of the invention.
Figure 8:
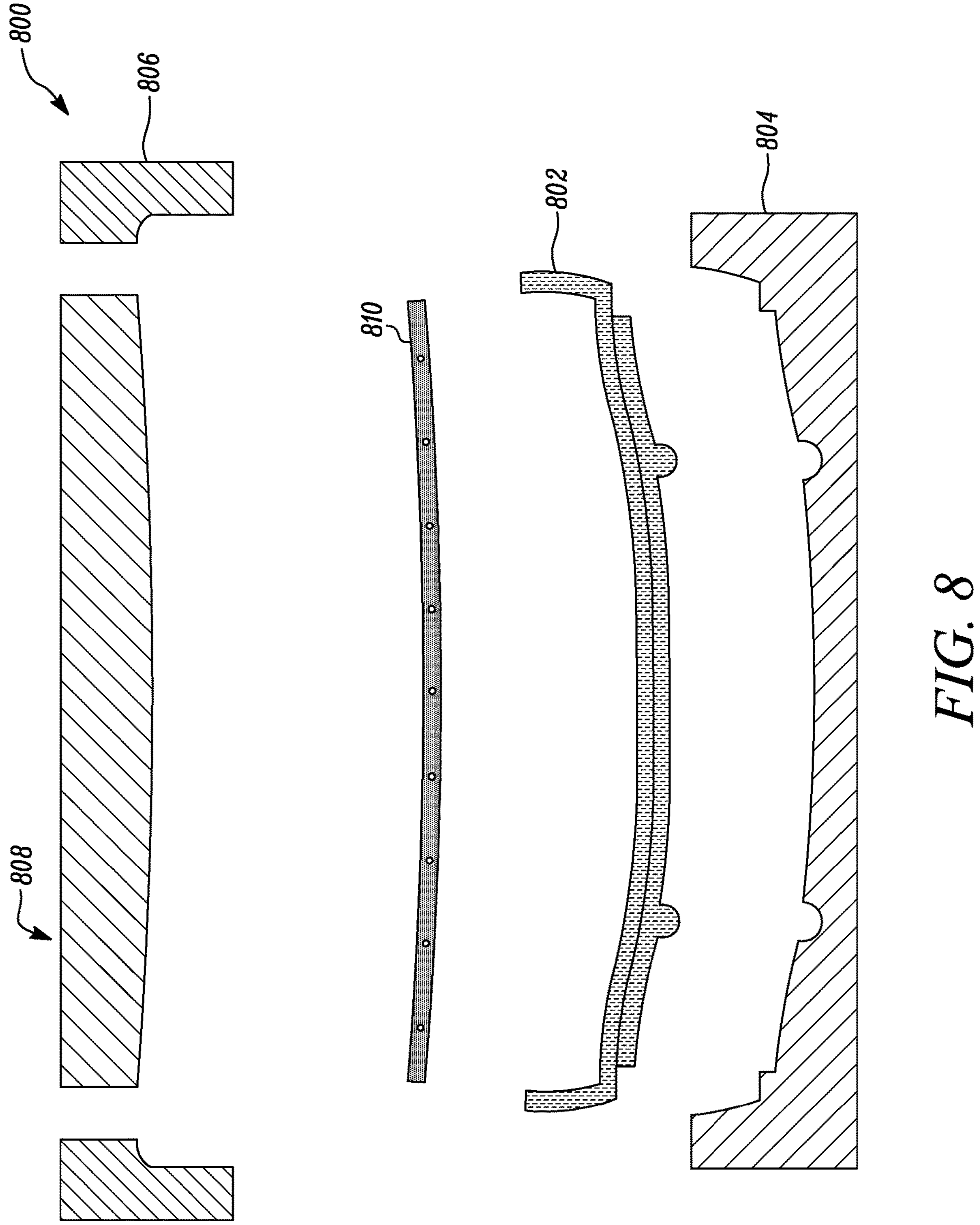
FIGS. 8 to 10 illustrate cross-sectional views of different procedural steps in forming the skin-foam architecture as per the method of FIG. 7 according to certain embodiments of the invention.
Figure 9:
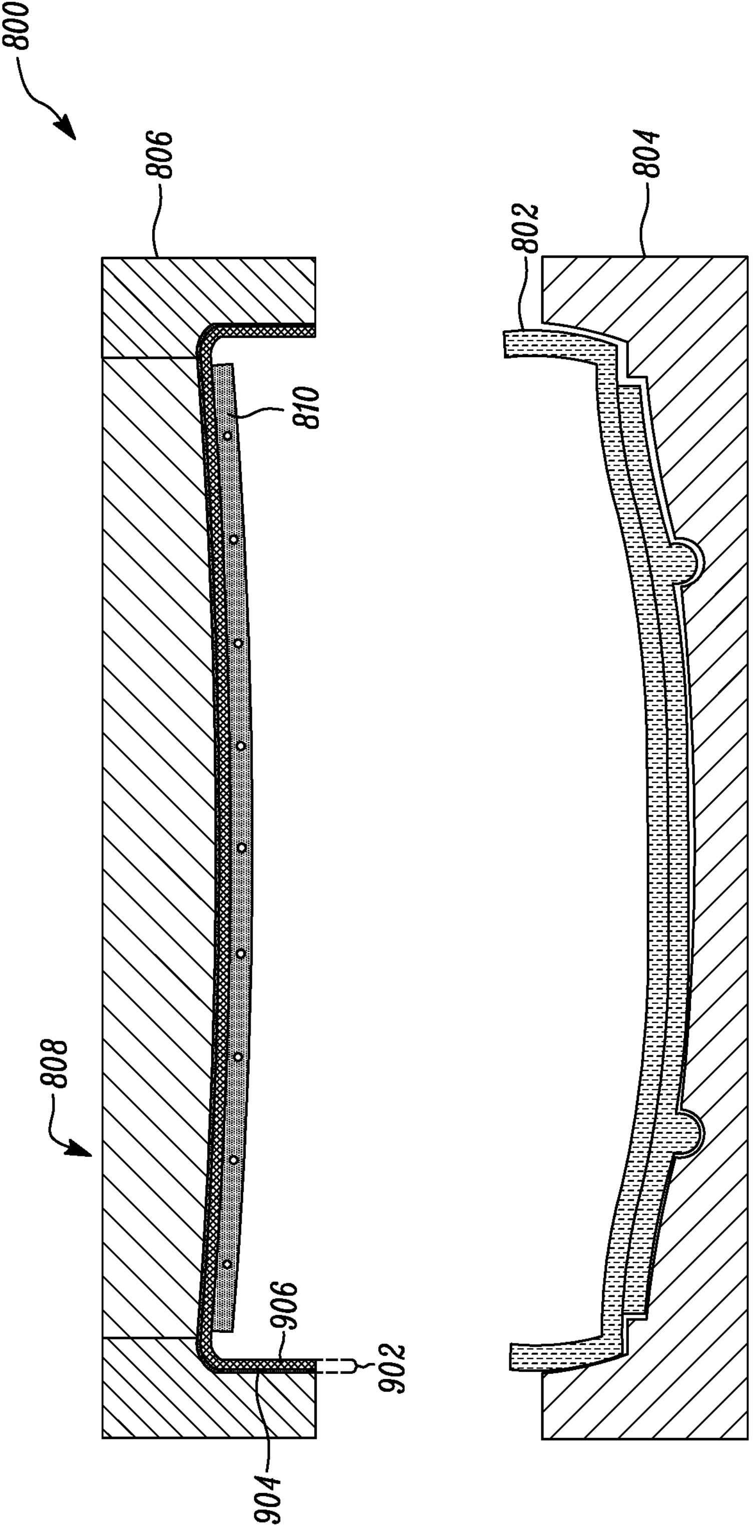
Figure 10:
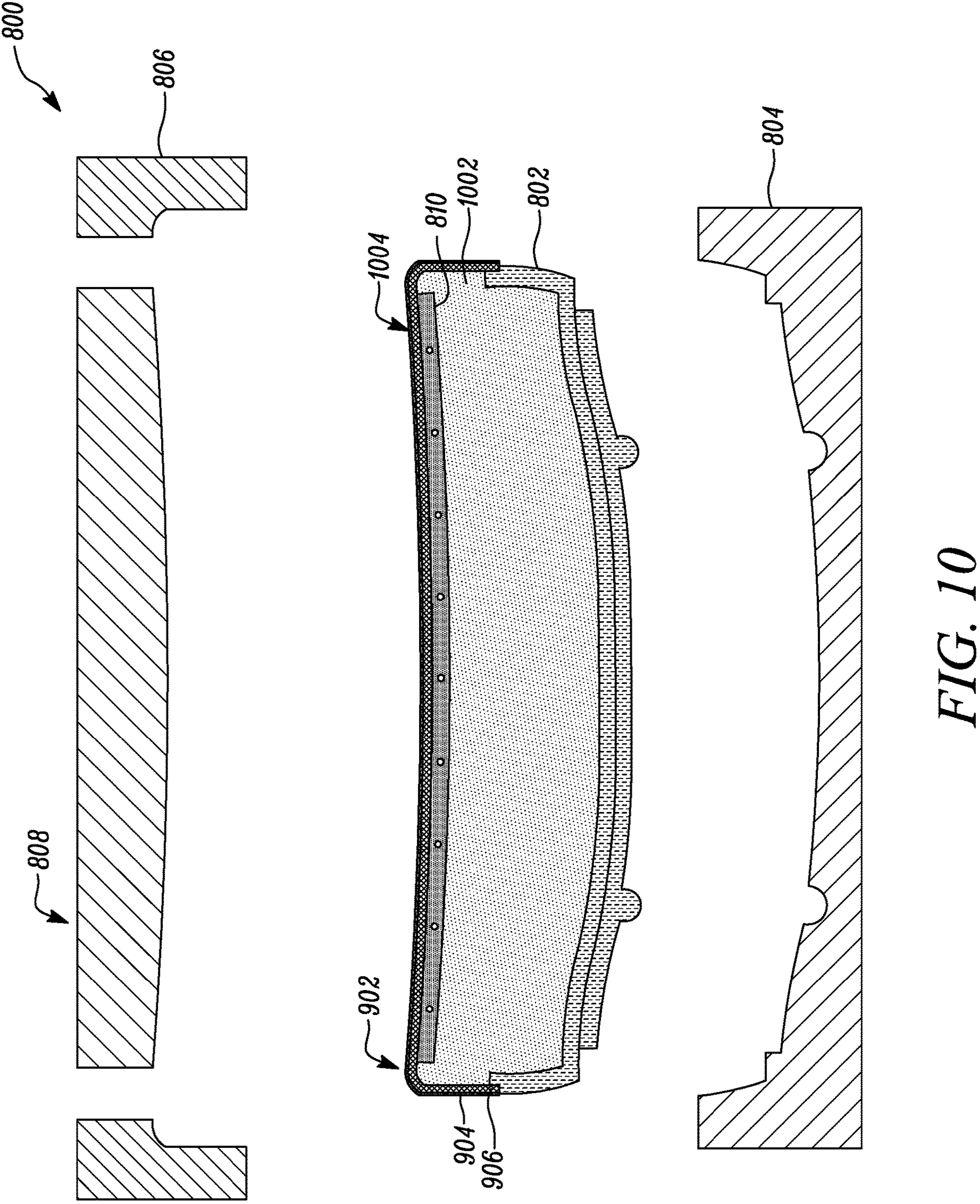

FIG. 7 is a flowchart of another method 700 for forming the skin-foam architecture and FIGS. 8 to 10 illustrate different steps in the process. Referring to FIGS. 7 and 8, at step 702, the backing cover 802 is loaded into the first portion 804 of the tool 800. Also, sliders 806 of the second portion 808 of the tool 800 are closed. The backing cover 802 may be rigid. Further, at step 704, the skin 902 (see FIG. 9) is applied onto the second portion 808 of the tool 800. The skin 902 includes the first layer 904 and the second layer 906. The second layer 906 is applied under the first layer 904. In one example, applying the skin 902 includes spraying and curing the first layer 904 on the second portion 808 of the tool 800. Further, the second layer 906 is sprayed under the first layer 904.

Referring to FIG. 9, the first layer 904 is a very thin UV resistant A-surface polyurethane. The second layer 906 is a relatively thicker layer of polyurethane backing that may provide structure to the skin 902. In certain embodiments, instead of polyurethane, another thermoplastic polymer or another polymer may be used for one of the layers. At step 706, a comfort pad 810 (see FIGS. 8 and 9) having conductive material is laminated and cured under the skin 902. In certain embodiments, the mesh does not contain any conductive material, but rather, only structural material. More specifically, the comfort pad 810 is laminated under the second layer 906 of the skin 902. The comfort pad 810 has a thin construction and may include conductive fibers, wires, or yarns for providing surface heating and capacitive sensing functionality for occupancy sensing. The comfort pad 810 provides initial provides the initial plush feel. In one example, the second layer 906 of the skin 902 is cured after or while the comfort pad 810 is laminated thereto. Alternatively, the comfort pad 810 can be laminated or attached to an already cured second layer 906 using for example, an adhesive.

At step 708, the first and second portions 804, 808 of the tool 800 are mated with each other, and at step 710, the foam 1002 is introduced between the first and second portions 804, 808 of the tool 800 using known foam-in-place process. Thereafter, the formed seating 1004 is released from the tool 800. Seating may be assembled on the seat frame of the vehicle 100.

Figure 11:
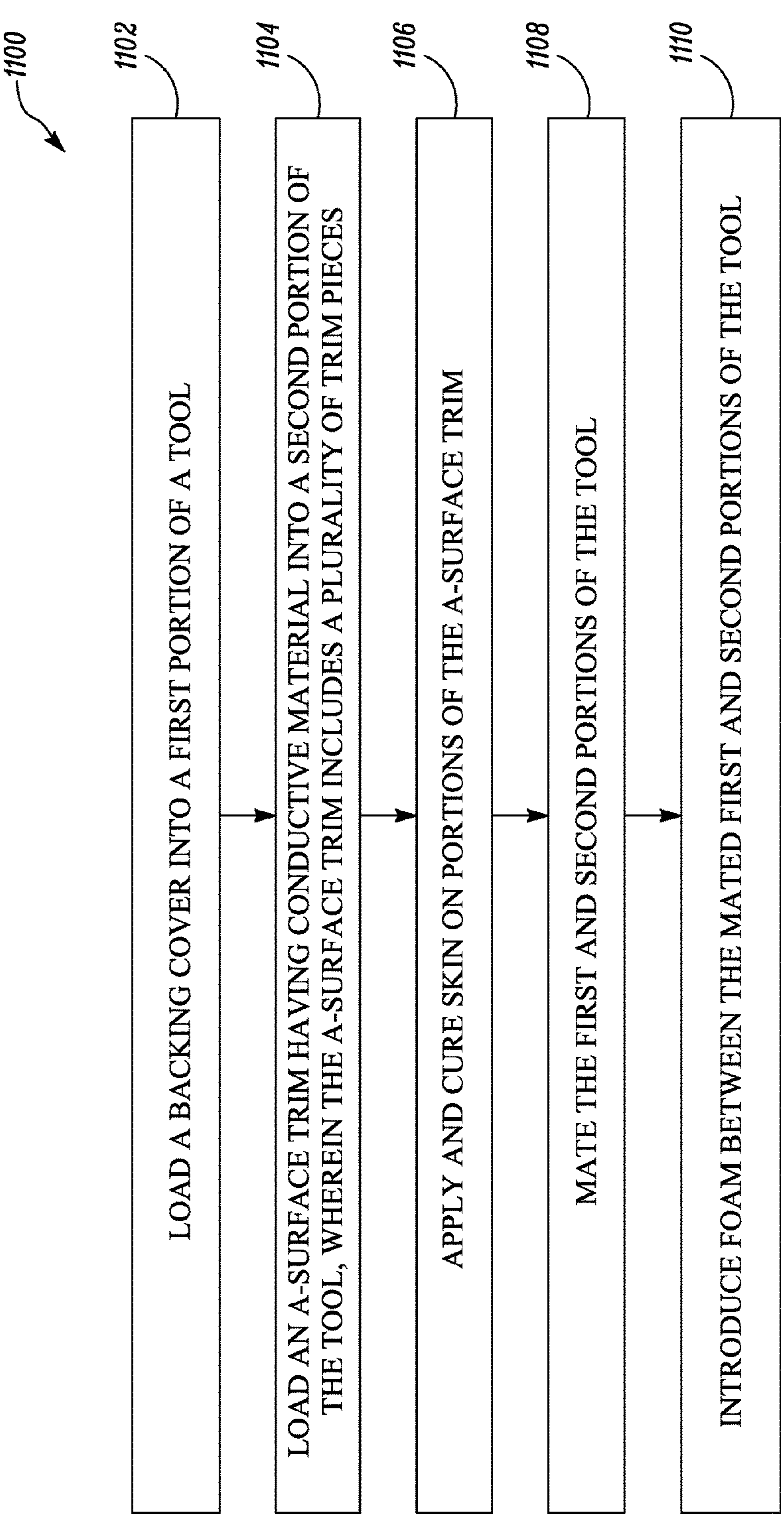
FIG. 11 illustrates a flowchart of a method for forming yet another embodiment of the skin-foam architecture according to certain embodiments of the invention.
Figure 12:
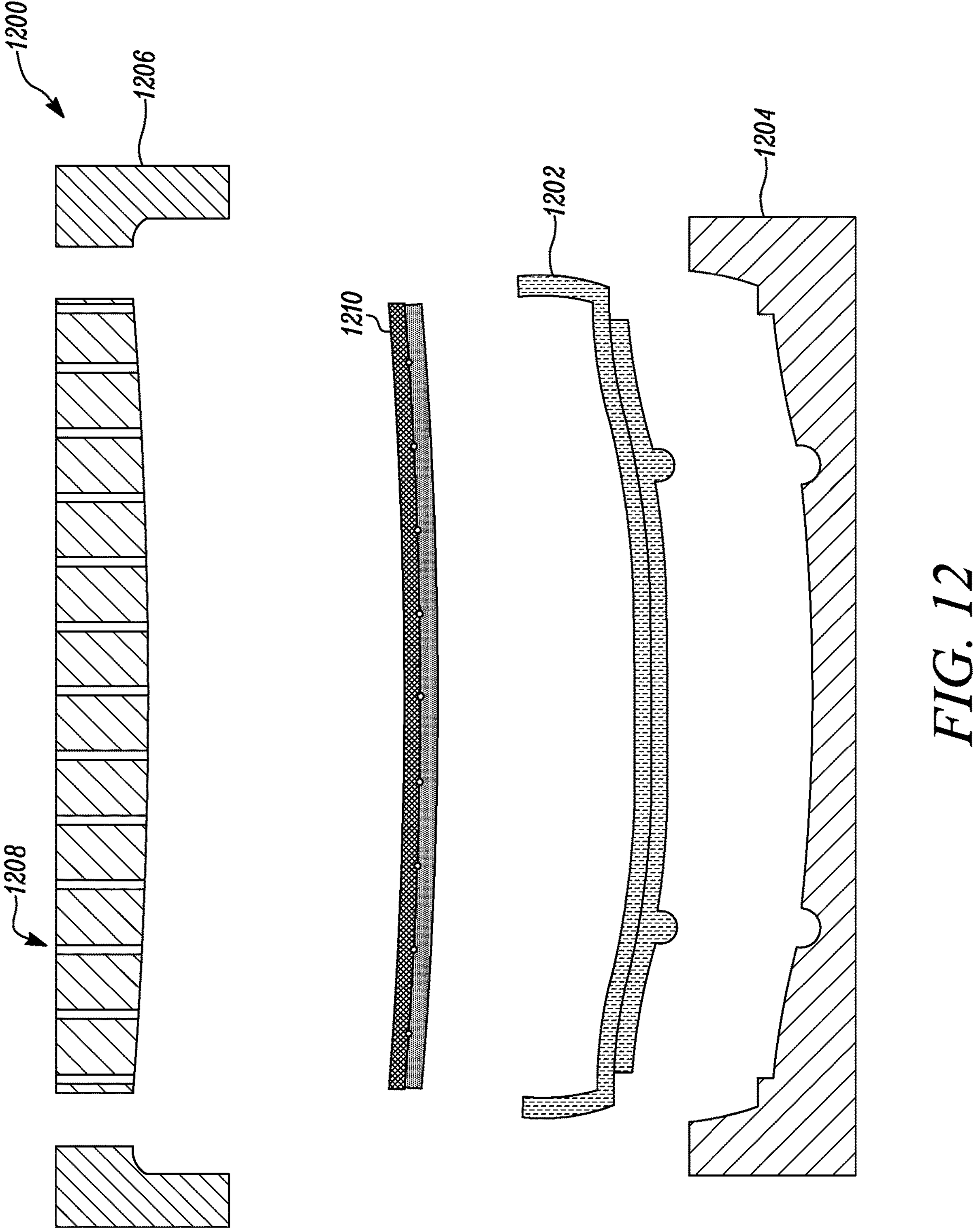
FIGS. 12 to 14 illustrate cross-sectional views of different procedural steps in forming the skin-foam architecture as per the method of FIG. 11 according to certain embodiments of the invention.
Figure 13:
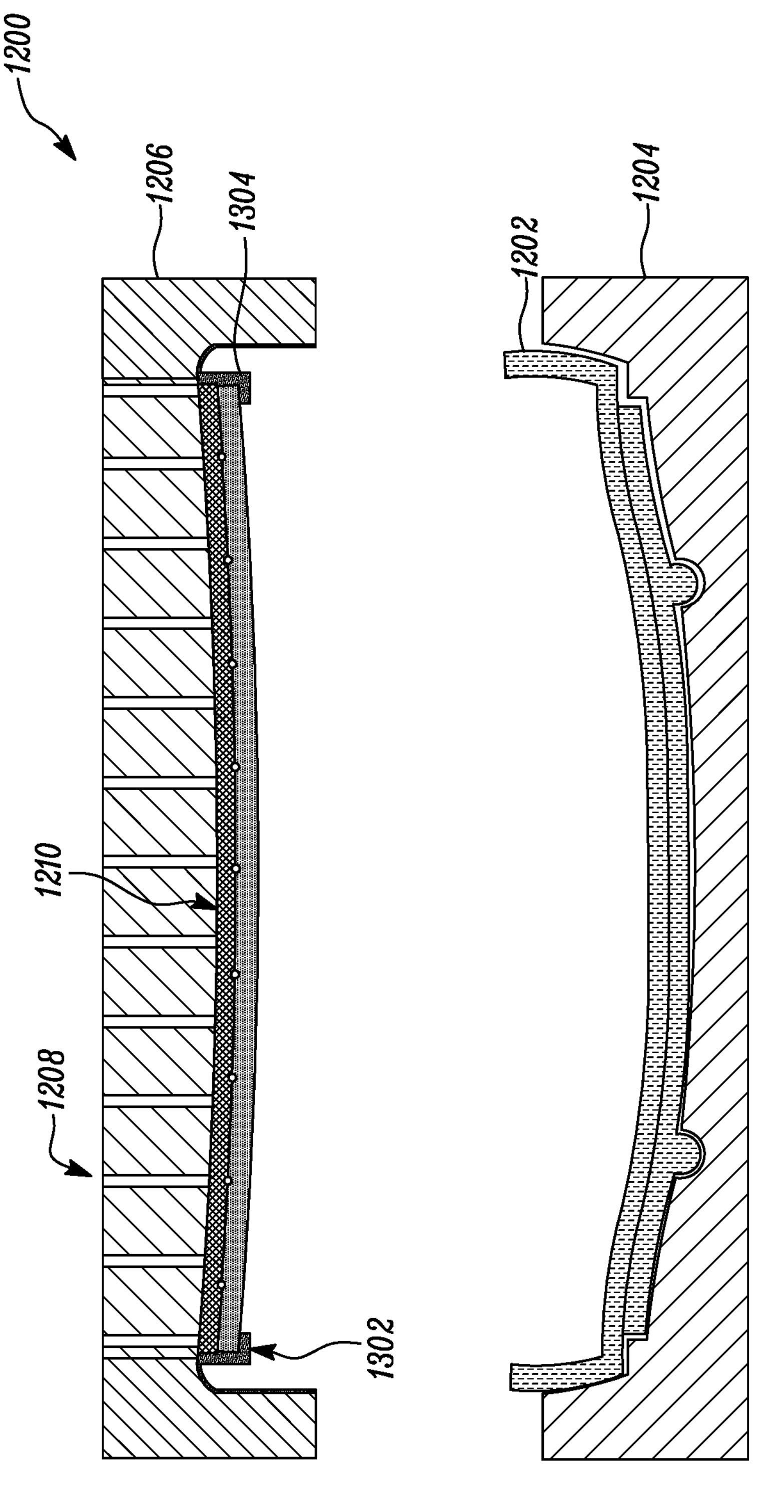
Figure 14:
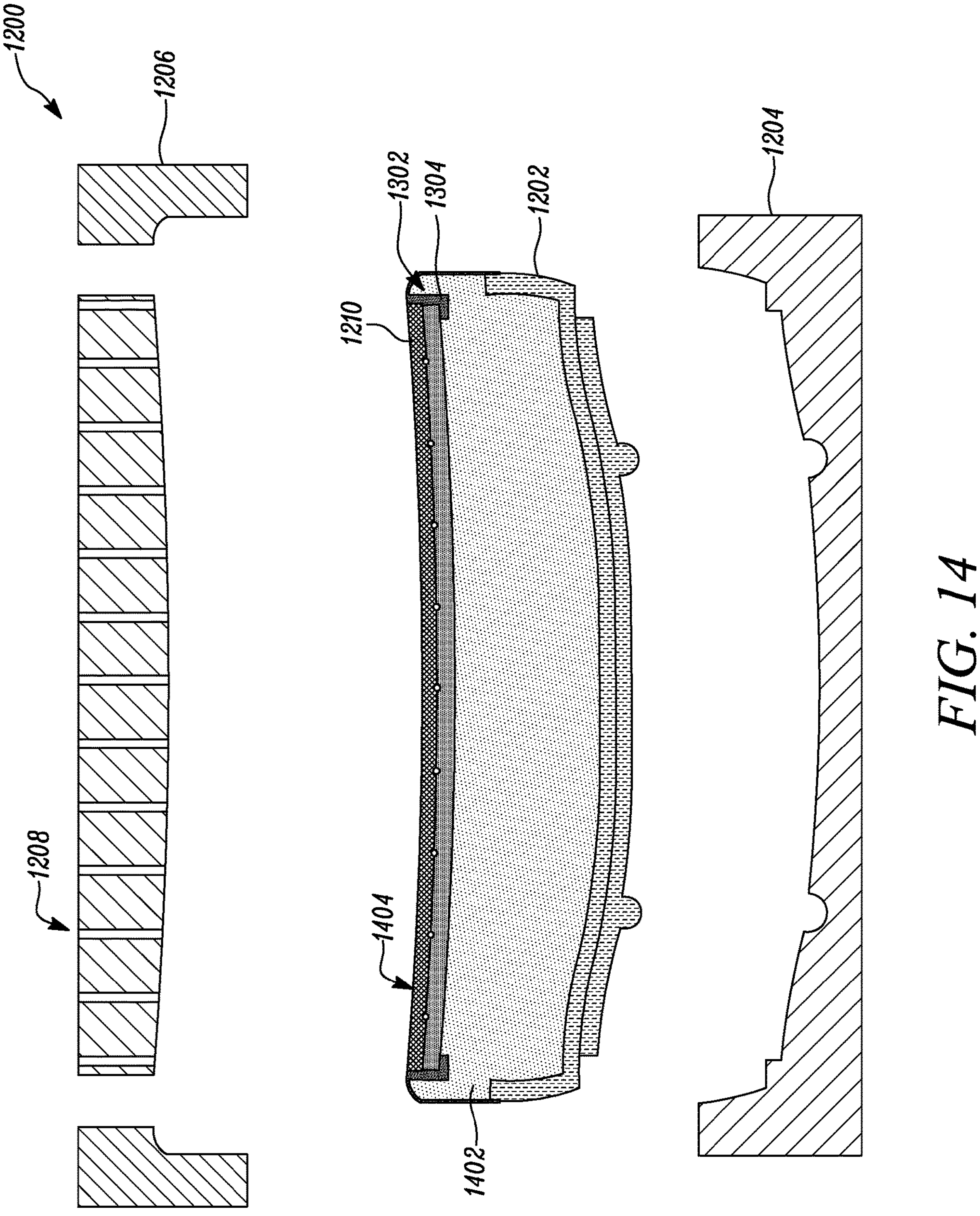

FIG. 11 is a flowchart of yet another method 1100 for forming the skin-foam architecture and FIGS. 12 to 14 illustrate different steps in the process. Referring to FIGS. 11 and 12, at step 1102, the backing cover 1202 is loaded into the first portion 1204 of the tool 1200. Also, sliders 1206 of the second portion 1208 of the tool 1200 are closed. The backing cover 1202 may be rigid. The tool 1200 includes multiple channels or vacuum cavities as can be seen in the accompanying figures. At step 1104, an A-surface trim 1210 having conductive material is loaded into the second portion 1208 of the tool 1200. In certain embodiments, the mesh does not contain any conductive material, but rather, only structural material. The A-surface trim 1210 includes a number of trim pieces that are separately fabricated and may also include a comfort pad. The trim pieces are not sewn together or interconnected and can be made of any suitable material for example, synthetic, leather, or textile. The conductive material for example, yarns or fibers, may be placed inside the trim pieces and provide heating and capacitive functionality. The structure of the second portion 1208 of the tool 1200 having the channels assist in holding the trim pieces in place by applying a suitable pressure on the A-surface trim 1210.

Further, at step 1106, the skin 1302 (see FIG. 13) is applied onto portions of the A-surface trim 1210 and cured. The skin 1302 includes the first layer 1304 and the second layer (not shown). The second layer is applied under the first layer 1304. Referring to FIG. 13, the first layer 1304 is a very thin UV resistant A-surface polyurethane. The second layer is a relatively thicker layer of polyurethane backing that may provide structure to the skin 1302. In certain embodiments, instead of polyurethane, another thermoplastic polymer or another polymer may be used for one of the layers. The skin 1302 connects the multiple pieces of the A-surface trim 1210. In one example, the skin 1302 is applied at edges of the A-surface trim 1210.

At step 1108, the first and second portions 1204, 1208 of the tool 1200 are mated with each other, and at step 1110, the foam 1402 is introduced between the first and second portions 1204, 1208 of the tool 1200 using known foam-in-place process. Thereafter, the formed seating 1404 is released from the tool 1200. Seating may be assembled on the seat frame of the vehicle 100.

Figure 15:
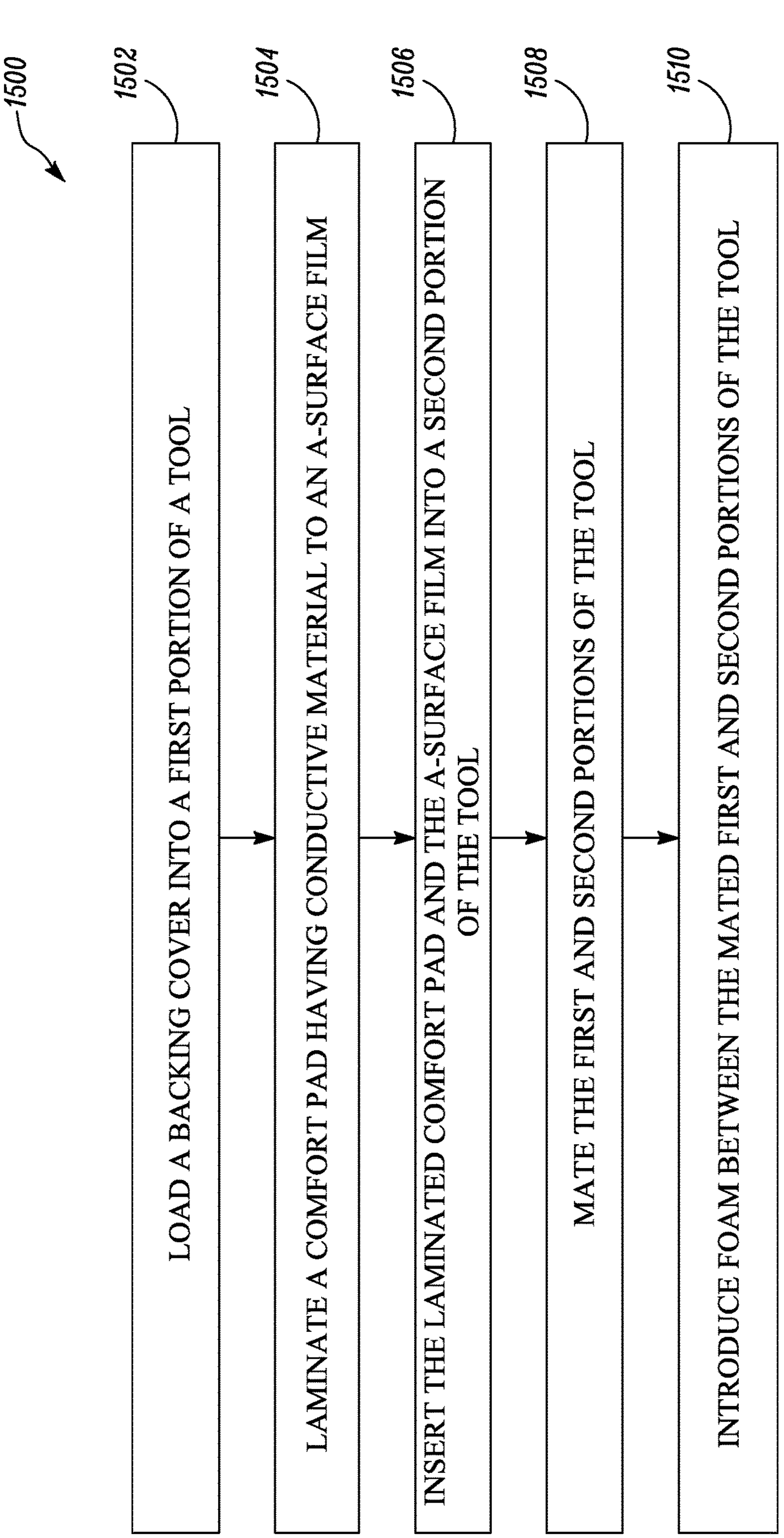
FIG. 15 illustrates a flowchart of a method for forming other embodiments of the skin-foam architecture according to certain embodiments of the invention.
Figure 16:
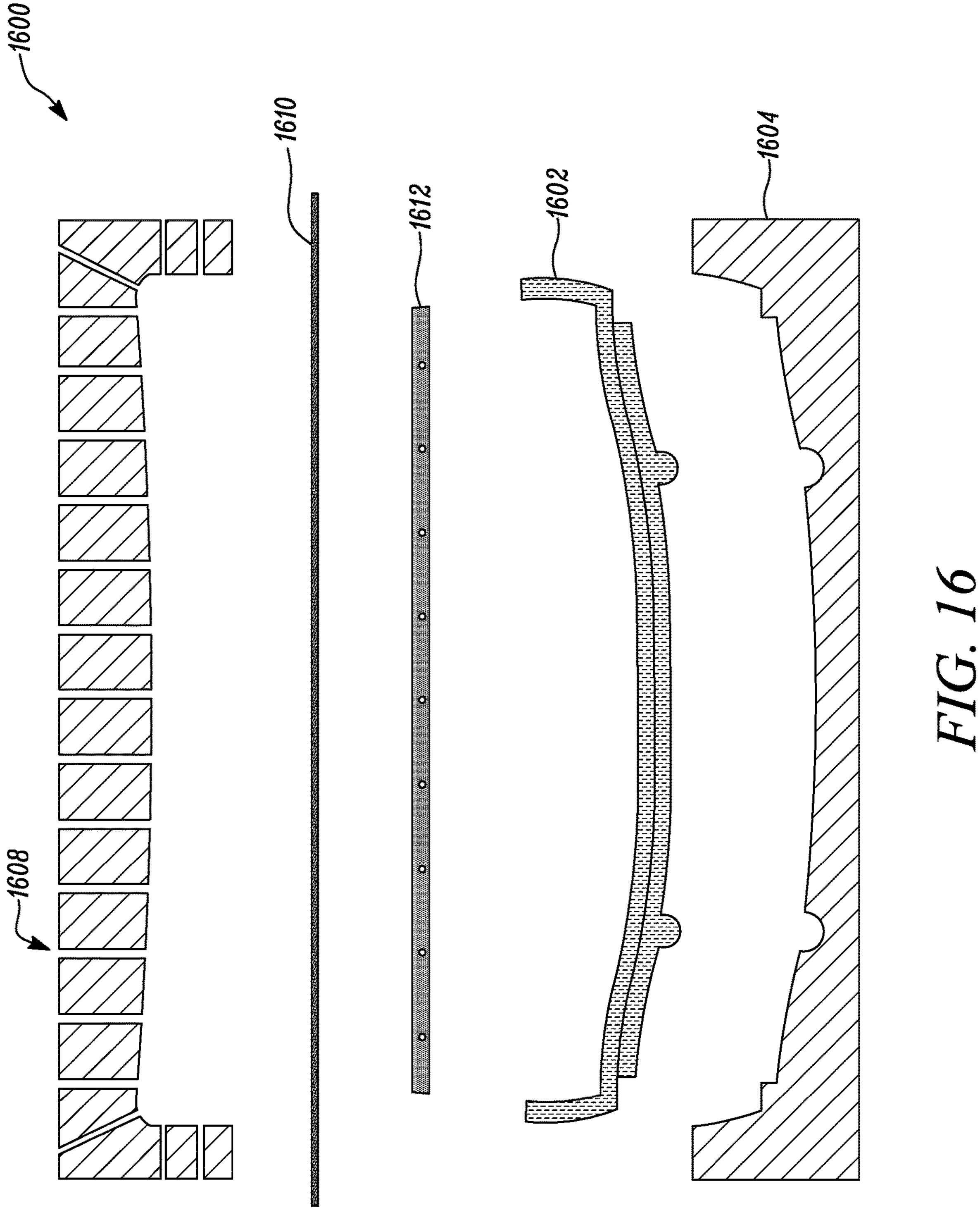
FIGS. 16 to 18 illustrate cross-sectional views of different procedural steps in forming the skin-foam architecture as per the method of FIG. 15 according to certain embodiments of the invention.
Figure 17:
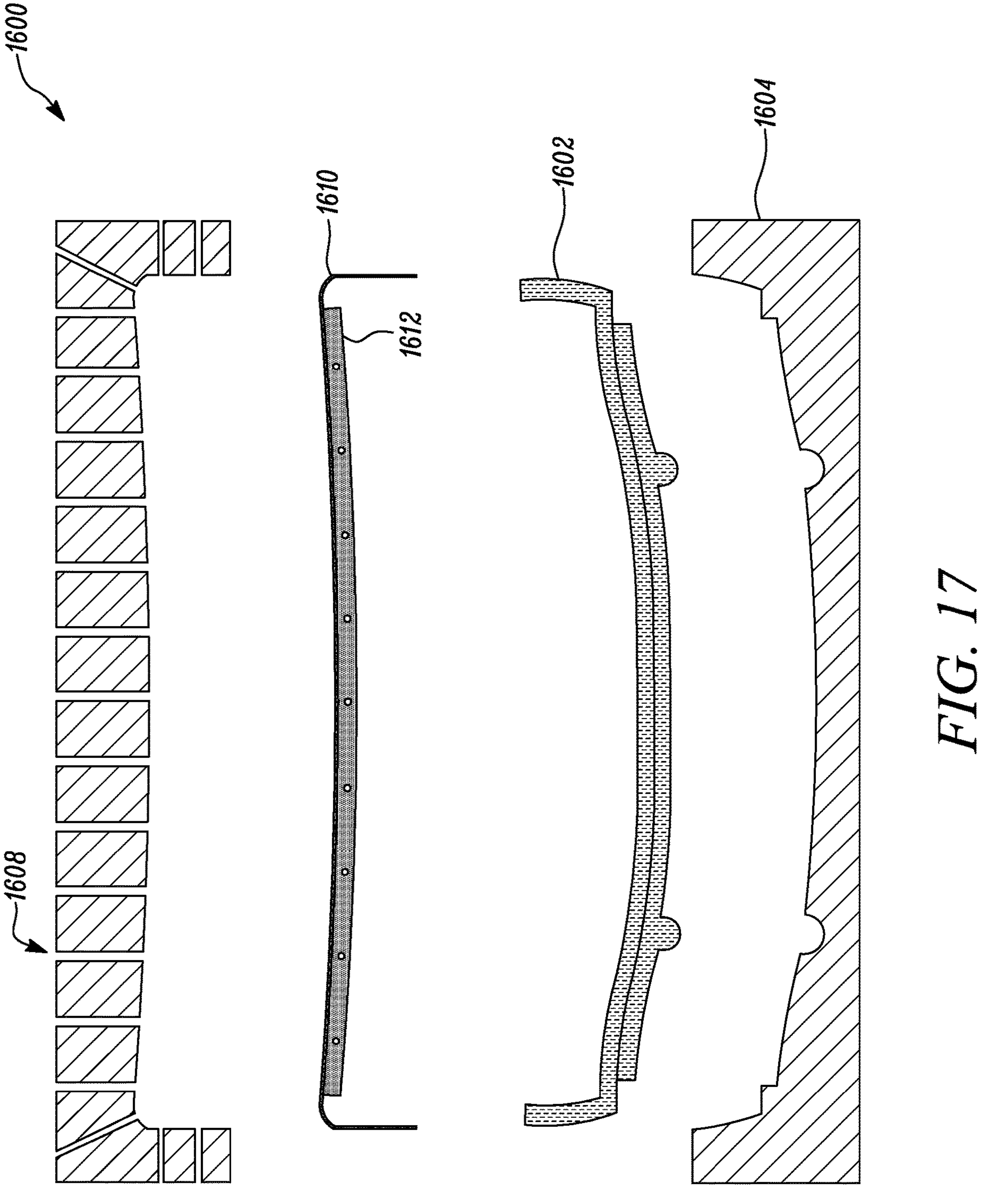
Figure 18:
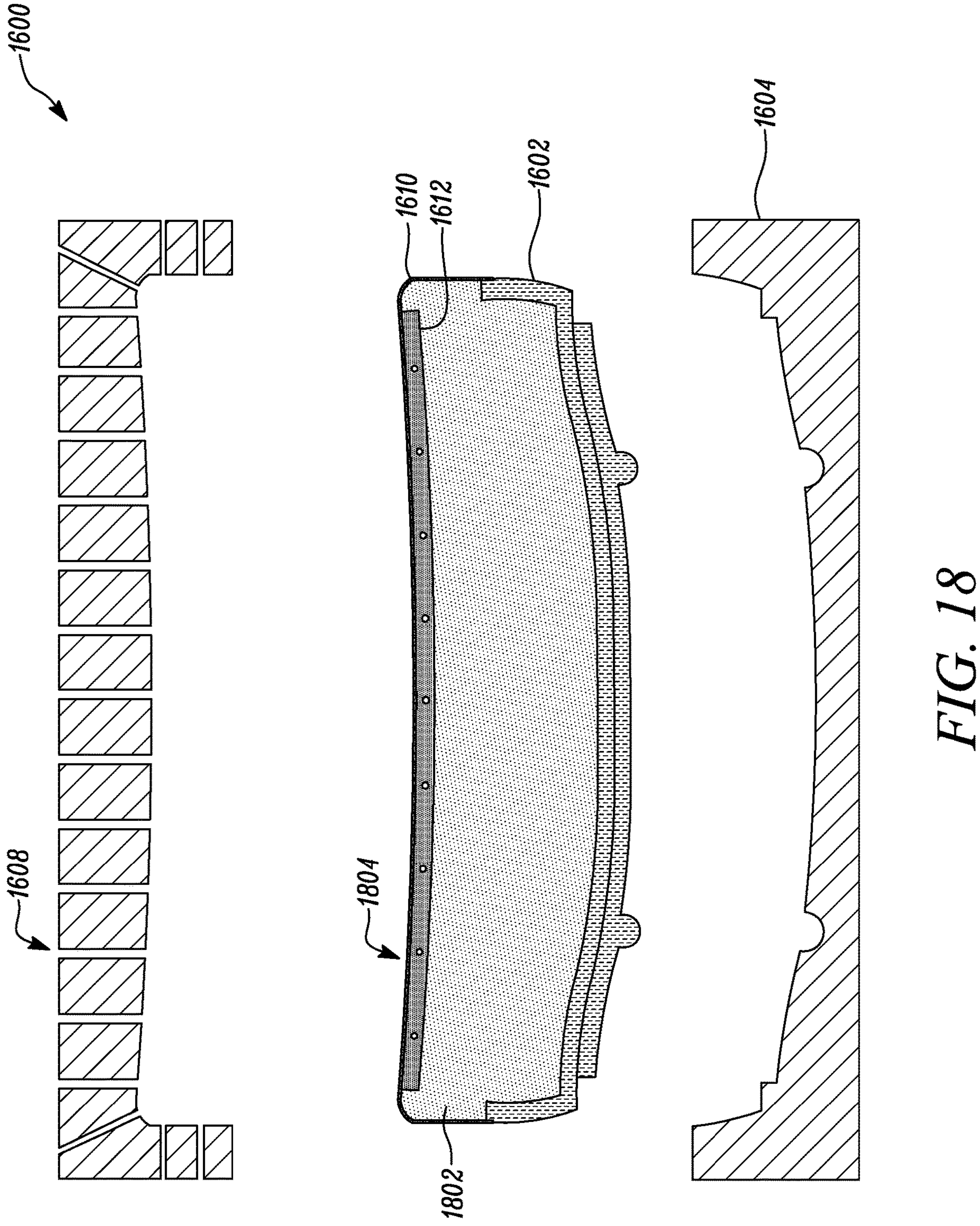

FIG. 15 is a flowchart of yet another method 1500 for forming the skin-foam architecture and FIGS. 16 to 18 illustrate different steps in the process. Referring to FIGS. 15 and 16, at step 1502, the backing cover 1602 is loaded into the first portion 1604 of the tool 1600. The backing cover 1602 may be rigid. The tool 1600 includes multiple channels or vacuum cavities as can be seen in the accompanying figures. Referring to FIGS. 15 to 17, at step 1504, a comfort pad 1612 having conductive material is laminated to an A-surface film 1610. The conductive material for example, yarns or fibers, and provide heating and capacitive functionality. In certain embodiments, the comfort pad 1612 does not contain conductive material and only contains structural material.

Further, at step 1506, the laminated comfort pad 1612 and the A-surface film 1610 are inserted into the second portion 1608 of the tool 1600. In one example, edge portions of the A-surface film 1610 are bent for inserting into the second portion 1608 of the tool 1600. The A-surface film 1610 may be held in place by applying a pressure through multiple channels provided in the second portion 1608 of the tool 1600.

At step 1508, the first and second portions 1604, 1608 of the tool 1600 are mated with each other, and at step 1510, the foam 1802 (see FIG. 18) is introduced between the first and second portions 1604, 1608 of the tool 1600 using known foam-in-place process. Thereafter, the formed seating 1804 is released from the tool 1600. Seating may be assembled on the seat frame of the vehicle 100.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed air vent assembly. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

What is claimed is:

1. A method for forming a skin-foam architecture for a seating, the method comprising:

loading a backing cover into a first portion of a tool; and applying and curing a skin on a second portion of the tool, the skin including a first layer, and a second layer under the first layer, wherein applying and curing the skin includes:

spraying the first layer directly on the second portion, and curing the first layer on the second portion, the first layer having a first thickness, and subsequent to applying and curing the first layer applying the second layer on the first layer, the second layer having a second thickness, wherein the second thickness is greater than the first thickness;

laminating a mesh under the skin and directly adjacent to the second layer of the skin subsequent to curing of the second layer, wherein the mesh is formed from a plurality of trim pieces that are not interconnected, wherein each trim piece includes conductive material, and wherein the second portion of the tool includes a plurality of channels configured to assist in holding the plurality of trim pieces in place by applying pressure on the mesh;

causing a placement of a comfort foam layer under the mesh and the skin and adjacent the mesh to bond the mesh to the skin;

mating the first portion and the second portion of the tool; and causing a placement of foam between the mated first portion and second portion of the tool under the comfort foam layer and adjacent the comfort foam layer, wherein the comfort foam layer and the foam between the mated first portion and second portion of the tool are separate layers.

2. The method of claim 1, wherein the first layer is made of UV resistant A-surface polyurethane.

3. The method of claim 1, wherein the second layer is made of polyurethane.

4. The method of claim 1, wherein applying the second layer includes spraying material onto the first layer.

5. The method of claim 1, wherein the conductive material includes conductive fibers or conductive wires.

6. A method for forming a skin-foam architecture for a seating, the method comprising:

loading a backing cover into a first portion of a tool;

applying and curing a skin on a second portion of the tool, the skin including a first layer, and a second layer under the first layer, wherein applying and curing the skin includes:

spraying the first layer directly on the second portion, and curing the first layer on the second portion, the first layer having a first thickness, and subsequent to applying and curing the first layer, spraying the second layer on the first layer, the second layer having a second thickness;

laminating a mesh under the skin directly adjacent the second layer, wherein the mesh is formed from a plurality of trim pieces that are not interconnected, wherein each trim piece includes conductive material, and wherein the second portion of the tool includes a plurality of channels configured to assist in holding the plurality of trim pieces in place by applying pressure on the mesh;

causing a placement of a foam layer onto the mesh and the skin, the foam layer located under the mesh and the skin, to bond the mesh to the foam layer and to bond the foam layer to the skin;

causing, after placement of the foam layer, a placement of foam between the first portion and the second portion of the tool when mated using foam in place to place the foam between the backing cover and the foam layer, wherein the foam layer and the foam between the mated first portion and second portion of the tool are separate.

7. The method of claim 6, wherein the first layer is made of UV resistant A-surface polyurethane.

8. The method of claim 6, wherein the second layer is made of polyurethane.

9. The method of claim 6, wherein the foam layer comprises a comfort foam layer.

10. The method of claim 6, wherein causing a placement of the foam layer under the mesh and the skin comprises spraying or pouring a material onto the mesh.

* * * * *